United States Patent [19]
van Staveren

[11] Patent Number: 5,336,413
[45] Date of Patent: Aug. 9, 1994

[54] PROCESS AND APPARATUS FOR THE PURIFICATION OF WATER

[75] Inventor: Nicolaas A. van Staveren, Kessel, Netherlands

[73] Assignee: E.M. Engineering F.T.S. B.V., Kessel, Netherlands

[21] Appl. No.: 33,177

[22] Filed: Mar. 16, 1993

[30] Foreign Application Priority Data

Mar. 19, 1992 [NL] Netherlands .................. 9200508

[51] Int. Cl.⁵ .......................................... B01D 31/00
[52] U.S. Cl. .................................... 210/650; 210/759; 210/760; 210/805; 210/195.2; 210/257.2; 210/661
[58] Field of Search .............. 210/650, 652, 661, 188, 210/195.2, 257.2, 805, 900, 760, 759

[56] References Cited

U.S. PATENT DOCUMENTS

| | | | |
|---|---|---|---|
| 4,160,724 | 7/1979 | Laughton | 210/760 |
| 4,252,654 | 2/1981 | Leitzke | 210/760 |
| 4,430,306 | 2/1984 | Mamba et al. | 210/760 |
| 4,548,716 | 10/1985 | Boeve | 210/652 |
| 4,698,153 | 10/1987 | Matsozaki et al. | 210/266 |
| 4,751,005 | 6/1988 | Mitsui et al. | 210/759 |
| 4,787,980 | 11/1988 | Ackermann et al. | 210/195.2 |
| 4,836,929 | 6/1989 | Baumann et al. | 210/748 |
| 4,913,827 | 4/1990 | Nebel | 210/760 |
| 5,039,416 | 8/1991 | Loew et al. | 210/759 |
| 5,073,268 | 12/1991 | Saito et al. | 210/900 |
| 5,259,972 | 11/1993 | Miyamaru et al. | 210/760 |

FOREIGN PATENT DOCUMENTS

| | | |
|---|---|---|
| 0438073A1 | 1/1990 | European Pat. Off. |
| 0413356A1 | 2/1991 | European Pat. Off. |
| 0436409A1 | 7/1991 | European Pat. Off. |
| WO90/14312 | 11/1990 | PCT Int'l Appl. |

Primary Examiner—Robert A. Dawson
Assistant Examiner—Ana M. Fortuna
Attorney, Agent, or Firm—D. Peter Hochberg; Mark Kusner; Michael Jaffe

[57] ABSTRACT

Process and apparatus for the purification of water, oxygen/ozone-gas mixture is introduced under high pressure in the water to be purified, and the thus obtained oxygen/ozone-gas mixture enriched water is passed to a purification stage which comprises at least one reactor. Not or insufficiently degraded contaminants are retained by a membrane filter unit and recycled to the purification stage. Thus contaminants, such as hydrocarbon compounds and the like, are recirculated until they are converted to carbon dioxide and water.

22 Claims, 2 Drawing Sheets

PROCESS AND APPARATUS FOR THE PURIFICATION OF WATER

BACKGROUND OF THE INVENTION

The invention relates to an apparatus for the purification of water. Particularly the invention relates to a process for the purification of water in which an oxygen/ozone-gas mixture is introduced in the water to be purified.

A process of this type is known. In this process an apparatus is used equipped with means for introducing an oxygen/ozone-gas mixture and a reactor for the conversion of contaminants, such as hydrocarbon compounds and the like, to carbon dioxide and water. The introduction of oxygen/ozone-gas mixture is carried out under atmospheric pressure. This process has the disadvantage that only low ozone concentrations are reached. Moreover, the reaction of ozone with contaminants to be degraded proceeds very slowly.

The invention aims to improve such a process to degrade in a fast and efficient way pesticides and the like present in the rinse water from the cleansing of agricultural spraying apparatus, the waste water from hydroponic cultivation systems, open field farms, fruit growing and arable farms, etc.

SUMMARY OF THE INVENTION

To this end in the proces of the invention the oxygen/ozone-gas mixture, in a purification stage, is dissolved in the water to be purified under high pressure and this water being enriched with oxygen and ozone is passed through at least one reactor, and the water from the reactor is completely or partly passed to a membrane filter unit and the retained liquid and further water from the reactor is again fed to the purification stage.

Because of the elevated pressure the oxygen/ozone-gas mixture dissolves better and higher concentrations are reached. In this way not only the reaction proceeds faster but the degradation capacity increases as well. Not or insufficiently degraded contaminants are retained by the membrane filter unit and recycled to the purification stage whereby contaminants are kept in circulation until they are degraded completely.

According to a favourable embodiment $H_2O_2$ is, in case more than one reactor is used, introduced after the first reactor. Hereby a further improvement of the oxidation of the remaining contaminants, such as hydrocarbon compounds, is realized.

Advantageously the water to be purified is passed over a biologically active carbon filter. Here microorganisms cause degradation of already partly degraded contaminants.

According to a preferred embodiment the water from the purification stage is subjected to a treatment for the removal of gas before being fed to the purification stage. Removal of $CO_2$ and $HCO_3-$ results in improved reaction conditions and consequently accelerated degradation.

Furthermore, the present invention relates to an apparatus for effectively carrying out the previously disclosed process.

To this end the apparatus of the invention comprises a purification stage with an inlet side and an outlet side, which purification stage comprises at least a reactor, a pump and means for introducing oxygen/ozone-gas mixture, the outlet side of which is connected to a membrane filter unit and connected to the inlet side of the purification stage. Thus an apparatus is provided with which oxygen/ozone-gas mixture can be dissolved in the water to be purified efficiently and contaminants can be degraded rapidly. Not or partly degraded contaminants, retained by the membrane filter unit, are recycled to the inlet side of the purification stage and are subjected to the oxidation treatment once again until they are degraded sufficiently.

Preferably the apparatus comprises a purification stage provided with two serially connected reactors, means being provided between the reactors for feeding $H_2O_2$ to the water. This results in a further improvement of the oxidation of the remaining hydrocarbon compounds.

In order to accelerate the degradation of contaminants present in the water preferably at least one reactor is equipped with a catalyst. This reduces the residence time of the water to be purified in the reactor.

For the improvement of the oxidation by the oxygen/ozone-gas mixture, a device for the removal of gas is provided at the inlet side of the purification stage. $CO_2$ and $HCO_3-$ inhibit the degradation of contaminants and are consequently advantageously removed.

The purification stage of the apparatus according to the invention is preferably connected to a biologically functioning active carbon filter via a flow control valve, the outlet side being connected to the inlet side of the purification stage and the inlet side of the membrane filter unit. In this biologically functioning active carbon filter the partially degraded contaminants are further degraded by microorganisms.

The invention also relates to a reactor with a design as described above.

BRIEF DESCRIPTION OF THE DRAWINGS

The invention is hereinafter explained by reference to the drawing, in which an example of an embodiment of the apparatus according to the invention is schematically shown.

DETAILED DESCRIPTION OF A PREFERRED EMBODIMENT

Figure 1:
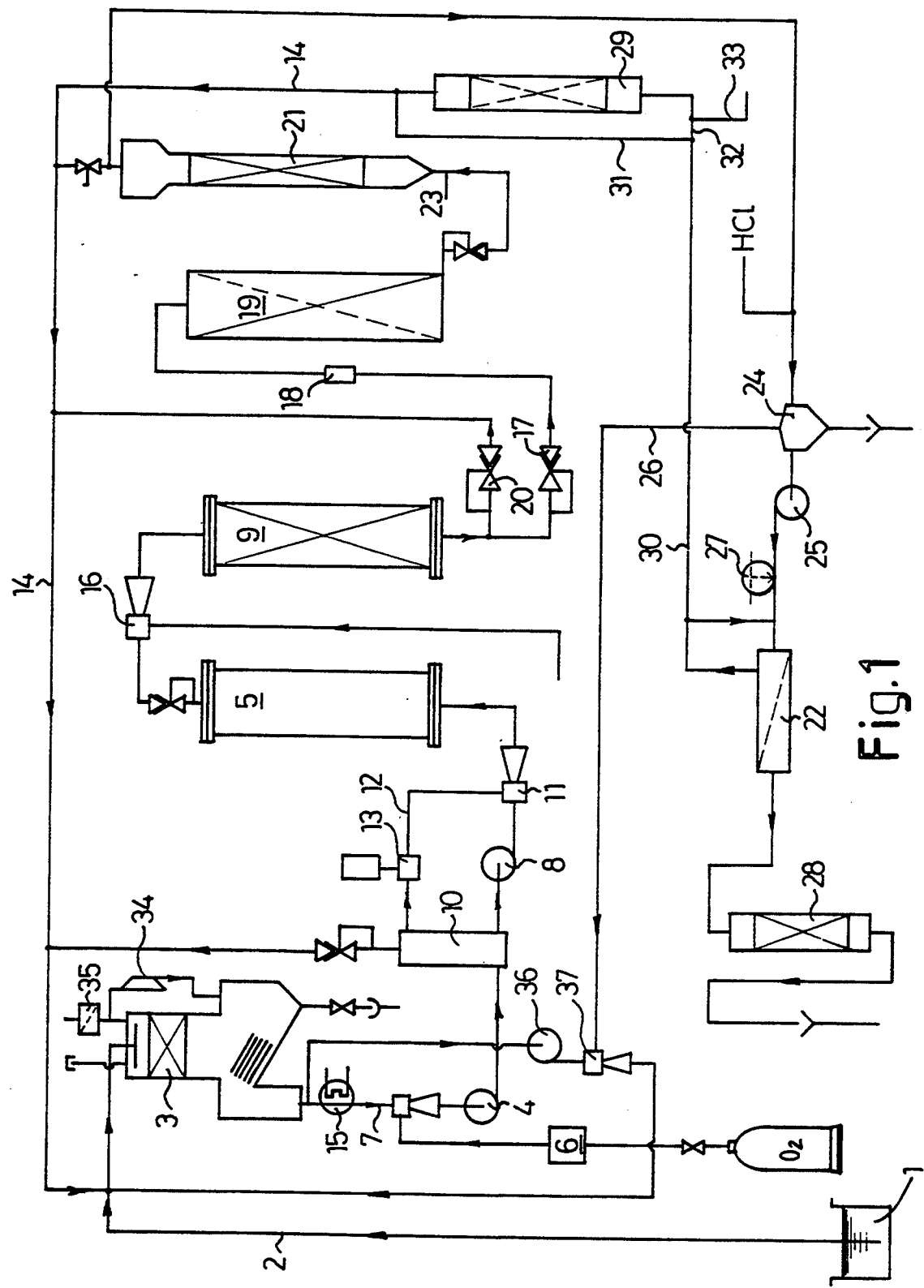
FIG. 1 is a diagram of an embodiment of the apparatus according to the invention for the purification of water.

In FIG. 1 an apparatus for the purification of water is depicted schematically, which is in particular suitable for use in the purification of rinse water from the cleansing of agricultural spraying apparatus, the waste water from hydroponic cultivation systems, open field farms, fruit growing and arable farms, etc. The apparatus is equipped with a collecting tank 1, from which the water to be purified is fed via a feed line 2 to a stripper 3 which is detailed hereafter. The water to be purified is drawn by a pump 4, which feeds the water, preferably from the bottom up, under increased pressure to a reactor 5. The apparatus is further equipped with a corona generator 6, which is known in itself and which feeds oxygen/ozone-gas mixture to line 7, for example, before pump 4. Pump 4 delivers the water under a pressure of, for example, 4 bar. Part of the oxygen/ozone-gas mixture dissolves during the process in the water. In the described apparatus, a pump 8 which is, for example, a centrifugal pump, is connected to the outlet of the pump 4 and feeds the water to be treated to two serially connected reactors 5 and 9. The pump 8 increases the process pressure in this purification step to a value of preferably 16-100 bar, for example, 20 bar.

Between the pump 4 and the pump 8 a gas collecting device 10 is provided in which undissolved oxygen/ozone-gas mixture is collected. A water-jet pump 11 draws via a by-pass tube 12 oxygen/ozone-gas mixture from the gas collecting device 10, the oxygen/ozone-gas mixture being delivered by means of a pump 13 which is suitable for pumping gas with sufficient pressure, for example, a water-ring pump. This causes the oxygen/ozone-gas mixture to dissolve completely at the high pressure in the water. In this way it is prevented that undissolved gas impedes the operation of pump 8.

If the pressure of the oxygen/ozone-gas mixture rises too high then the gas mixture can be passed via line 14 to the stripper 3. In practice this measure results in some pre-purification in stripper 3.

Preferably the water to be purified in which oxygen-/ozone-gas mixture has to be dissolved is cooled in a way known per se to increase the gas concentration in the water and to facilitate its solvation in the water. To this end the water to be purified can be passed to a cooling arrangement 15, which cooling arrangement 15 can be provided before the pump 4 and after the stripper 3.

A water-jet pump 16 is provided between the two reactors 5,9 which adds $H_2O_2$ to the partially purified water from reactor 5, boosting the oxidation process in the second reactor 9. Both reactor 5 and reactor 9 can contain a catalyst. For reactor 5 it is preferably a noble metal catalyst. The pH of the liquid to be purified is in reactors 5 and 9 preferably 7.5 to 8.5, in particular 8.2.

The outlet side of the second reactor 9 is connected to a overflow spill 17, the outlet side of which is connected via a flow control regulator 18 with a biologically functioning active carbon filter 19. Under the anaerobic conditions prevailing in the grains of the biologically active carbon filter 19 chlorinated hydrocarbons are degraded.

Active carbon is a suitable carrier material because it catalyzes the reaction between any unreacted hydrogen peroxide and any contaminants still present in the water. In this way the attainment of anaerobic conditions is promoted. Instead of active carbon also other carrier materials such as silica can be applied.

The outlet side of the biologically functioning active carbon filter 19 is, in the described embodiment connected via the biologically functioning fluidized bed reactor 21 to a membrane filter unit 22. In the fluidized bed reactor 21, which is at the inlet side provided with means 23 for the feed of oxygen-containing gas, the oxidizable compounds formed are degraded oxidatively in the biologically functioning active 19.

The water derived from active carbon filter 19 is, in total or partly, fed to the membrane filter unit 22, the membrane of which retains, in the embodiment described here, all molecules with a molecular weight >100. Also a membrane can be applied with a cut-off value of 60 Daltons. The active carbon filter 19 not only serves for further degradation of contaminants but also provides for the removal of undissolved material which could affect the performance of the membrane in the membrane filter unit 22 negatively. Preferably a gas removal device 24 is provided before the membrane filter unit 22 such as a vacuum gas removal device for the removal of gasses, amongst which in particular carbon dioxide, formed in amongst others the biologically functioning fluidized bed reactor 21. A pump 25 is provided between the membrane filter unit 22 and the gas removal device 24 for drawing degassed liquid from the gas removal device 24. Via a line 26 connected with the gas removal device 24 withdrawn gasses are discharged. In this way the interfering action of gasses on the efficiency of the filtration process is prevented. Also material precipitated by the addition of acid, to be described shortly can be removed in this step.

To prevent the formation of scale in the membrane filter unit 22 acid, for example, hydrochloric acid can be introduced before the membrane filter unit 22 and preferably before the gas removal device 24, as a result of which the pH is adjusted to a value from 5 to 6.5. This low pH also promotes the removal of carbon dioxide from the liquid stream transported to the filter unit 22. Moreover, a temperature control device 27 can be provided between the purification stage and the membrane filter unit 22. The cut-off value of the membrane in the membrane filter unit 22 depends on the temperature and can be maintained on the desired cut-off value with the temperature control device 27. For the membrane in the membrane filter unit 22 to perform well a sufficiently large flow is required. This can be attained by recycling part of the retained liquid in the feed to the membrane filter unit 22. To carry out the filtration process a pump, not shown, is included in the membrane filter unit 22.

The filtrate from the membrane filter unit 22 is fed to an active carbon filter 28. The treated water derived from the active carbon filter 28 is discharged or reused. The retained liquid from the membrane filter unit 22 contains large, consequently possibly still toxic, not yet or not yet completely degraded molecules. The retained liquid is recycled via line 14 to stripper 3. In this way not or not completely degraded contaminants are kept in recirculation until they are adequately degraded.

Between the retained liquid outlet line 30 of the membrane filter unit 22 and the purification stage means are located for increasing the pH. For example, a grain reactor 29 can be mounted after the membrane filter unit in which the pH of a part of the retained liquid is increased to 7.5–10 with a base like caustic soda. To this end the retained liquid outlet line 30 is divided in a first retained liquid sub-line and a second retained liquid sub-line 32, the latter of which is provided with means 33 for introduction of pH-increasing compounds and subsequently the grain reactor 29, and the outlet side of the grain reactor 29 is connected with the first retained liquid sub-line 31. The pH increase promotes the deposition of scale-forming salts on grains in the grain reactor 29. The grains may comprise calcium carbonate or dolomite grains. Under these conditions of high pH ions are captured which have not left the system through the membrane of the membrane filter unit 22. The pH of the retained liquid passed via the first retained liquid sub-line 31 is increased with the water discharge at the outlet side of the grain reactor 29, if the occasion arises, to a value suitable for further purification of the retained liquid, for example, a pH of 7.5–8.5.

A blower 34, with a preceding air purification unit 35, passes air through the stripper 3 and provides in this way for the removal of $CO_2$ and $HCO_3-$, which compounds interfere with the oxidation reaction by ozone. It is possible to adjust the air-flow rate in dependence of the carbon dioxide concentration to be removed from the liquid stream fed to the stripper 3. As indicated the air can be partially recirculated. This saves energy. Because the stripper 3 performs better when the flow of the liquid stream is large, a pump 36 can be provided. In the embodiment shown a water-jet pump 37 is used to discharge gasses from the gas removal device 24. In the stripper 3 these gasses are discharged into the atmosphere.

The apparatus can of course be provided with means for recording and adjusting process parameters such as temperature and acidity to allow an efficient process control.

The disclosed apparatus has the advantage of attaining an almost complete degradation of all hydrocarbon compounds to carbon dioxide and water by functioning under highly increased pressure in the purification stage in the reactors 5 and 9. The addition of $H_2O_2$ in the purification stage working under increased pressure leads to an efficient further oxidation in reactor 9. Not or still insufficiently degraded contaminants are retained by the membrane of the membrane filter unit 22 working as a molecular sieve and recycled to the purification stage.

From the outlet of each reactor and from the membrane filter unit 22 branching lines extend to the inlet side of the purification stage. This is especially beneficial if the contaminants in the water purified by the respective reactors can be degraded more efficiently by a preceding reactor than a subsequent reactor. There may also be branching lines to other reactors (each device in which contaminants are degraded), the same reactor and there may be lines from more than one reactor to the membrane filter unit 22. An apparatus according to the invention provided with a plurality of such branching lines is very flexible and consequently suitable for the degradation of a large variety of compounds.

Figure 2:
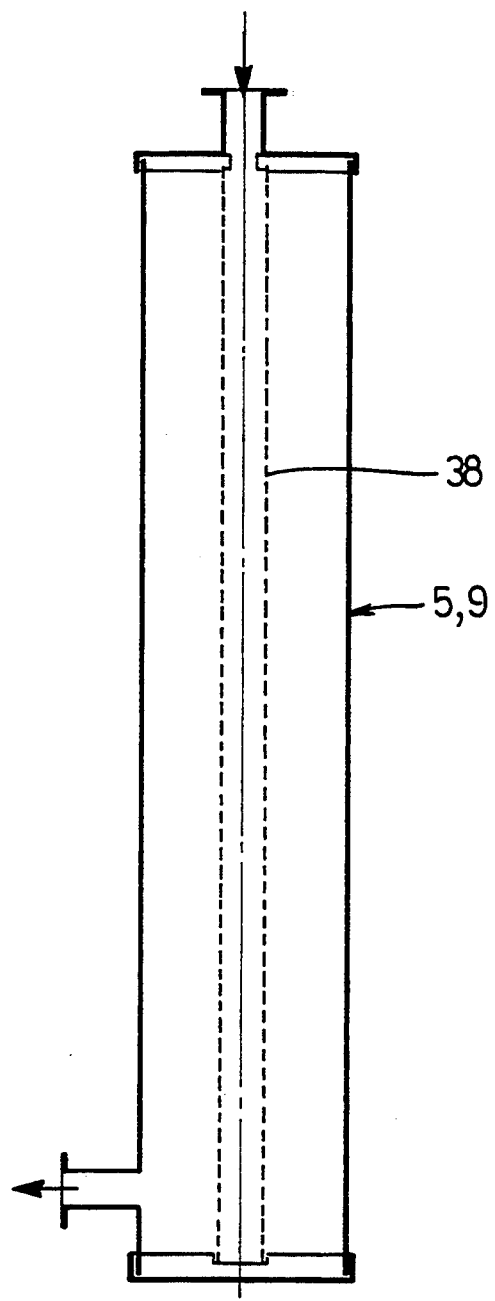
FIG. 2 shows in more detail the reactor of the apparatus of FIG. 1.

As shown in FIG. 2 in further detail, both reactors 5,9 can be provided with a porous catalyst tube 38 joining the inlet side of the reactor. The catalyst tube 38 is centrally arranged in the cylindrically shaped reactor 5.9. As a catalyst preferably a noble metal is used, for example, palladium, platinum or iridium. In reactor 9 also vanadium, iron, copper or silver can be applied.

The invention is not limited to the above described embodiment, which can be varied within the scope of the invention in several ways. The apparatus described here is given as an example of an apparatus with which a large variety of organic contaminants can be degraded. For applications in which only a limited number of contaminants has to be degraded a simpler design may suffice.

What is claimed is:

1. A process for the purification of water, said process comprising:
    purifying the water in a purification stage by dissolving under high pressure an oxygen/ozone-gas mixture in the water to produce oxygen/ozone enriched water, and passing the oxygen/ozone enriched water through a reactor means to effect the oxidation of the enriched water;
    discharging the water from the reactor means;
    feeding the discharged water to a membrane filter unit;
    retaining part of the water at the membrane filter unit and discharging part of the water from the membrane filter unit as purified water; and
    recycling the retained water at the membrane filter to the purification stage to purify the retained water by dissolving the oxygen/ozone-gas mixture in the retained water to produce oxygen/ozone enriched water, and passing the oxygen/ozone enriched water through reactor means to effect the oxidation of the enriched water.

2. A process according to claim 1, wherein said reactor means comprise at least two reactors, and the step of passing the oxygen/ozone enriched water through the reactor means comprises passing the water through a first reactor and then introducing $H_2O_2$ in the water.

3. A process according to claim 1, wherein between the steps of discharging the water from the reactor means and feeding the water to said membrane filter unit, performing the steps of passing the water discharged from the reactor means through a biologically active carbon filter, and discharging the water from the active carbon filter.

4. A process according to claim 1, wherein between the steps of discharging water from the reactor means and feeding the discharged water to said membrane filter unit, performing the steps of introducing acid into the water and removing gas from the acidified water.

5. A process according to claim 1, wherein said step of retaining comprises the step of retaining in said membrane filter unit molecules with a molecular weight greater than 100.

6. A process according to claim 1, wherein said water passing through said reactor means has a pH level in the range of approximately 7.5 to 8.5.

7. A process for the purification of water, said process comprising :
    purifying the water in a purification stage by dissolving under high pressure an oxygen/ozone-gas mixture in the water to produce oxygen/ozone enriched water; and passing the oxygen/ozone enriched water through reactor means to effect the oxidation of the enriched water;
    discharging part of the water from the reactor means and retaining part of the water from the reactor means;
    feeding the discharged water to a membrane filter unit;
    retaining part of the water at the membrane filter unit and discharging part of the water from the membrane filter unit; and
    recycling the retained water at the membrane filter unit, along with the retained water at the reactor means, to the purification stage for purification.

8. A process according to claim 7, wherein said reactor comprises at least two reactors, and the step of passing the oxygen/ozone enriched water through said reactor means comprises passing the water through a first reactor and then introducing $H_2O_2$.

9. A process according to claim 7, wherein between the steps of discharging water from the reactor means and feeding the discharged water to said membrane filter unit, the step of passing the water over a biologically active carbon filter is performed.

10. A process according to claim 7, wherein the process for the purification of water further comprises treating water retained at the reactor for the removal of gas before recycling the water to the purification stage for purification.

11. A process according to claim 7, wherein between the steps of discharging part of the water from the reactor means and feeding the discharged water to said membrane filter unit, the steps of introducing acid into the water and removing gas from the acidified water are performed.

12. A process according to claim 7, wherein said step of retaining part of the water at the membrane filter unit comprises the step of retaining in said membrane filter unit molecules with a molecular weight greater than 100.

13. A process according to claim 7, wherein said water passing through said reactor means has a pH level in the range of approximately 7.5 to 8.5.

14. An apparatus for purification of water comprising:

purification means for dissolving the water in an oxygen/ozone-gas mixture and for oxidizing the water enriched with oxygen and ozone, said purification means comprising:

reactor means for converting contaminants in the water to carbon dioxide and water;

pump means for feeding water to be purified to said reactor means;

means for feeding the oxygen/ozone-gas mixture to said reactor means; inlet means for receiving water;

and outlet means for discharging water, and a membrane filter unit, operatively connected to said outlet means of said purification means, said membrane filter unit comprising outlet means for discharging filtered water and for discharging retentate water to a recirculation outlet conduit for recirculation to said reactor means.

15. An apparatus according to claim 14, wherein said reactor means comprises two serially-connected reactors and said purification means further comprises means for introducing $H_2O_2$ in the water, wherein said means for introducing $H_2O_2$ is operatively connected between said two serially-connected reactors.

16. An apparatus according to claim 14, wherein said reactor means includes a catalyst.

17. An apparatus according to claim 14, wherein said apparatus for purification of water further comprises a means for removing gas; said means for removing gas operatively connected to said inlet means of said purification means.

18. An apparatus according to claim 14, wherein said apparatus for purification of water further comprises:

a biologically functioning active carbon filter having inlet means and outlet means;

wherein said outlet means of said active carbon filter is operatively connected to said inlet means of said purification means and said membrane filter unit;

a flow control regulator operatively connected between said outlet means of said purification means to said inlet means of said biologically functioning active carbon filter.

19. An apparatus according to claim 14, wherein said membrane filter unit outlet means comprises:

a first means for feeding water; and a second means for feeding water; said second means for feeding comprising:

means for introducing pH-increasing compounds; and a grain reactor connected to said first means for feeding water;

wherein said first means bypasses said second means.

20. An apparatus according to claim 14, wherein said outlet means of said purification means is operatively connected to a biologically functioning fluidized bed reactor having a means for feeding oxygen-containing gas.

21. An apparatus according to claim 14, wherein said pump means feeds water under pressure in the range of approximately 4-100 bar.

22. An apparatus according to claim 14, wherein said membrane filter unit retains molecules with a molecular weight greater than 100.

* * * * *